US009069781B2

(12) United States Patent
Rajabi et al.

(10) Patent No.: US 9,069,781 B2
(45) Date of Patent: *Jun. 30, 2015

(54) TECHNIQUES TO AUTOMATICALLY MANAGE FILE DESCRIPTORS

(75) Inventors: Zeyad Rajabi, Bellevue, WA (US); Tali Roth, Kirkland, WA (US); Matthew Wood, Sammamish, WA (US); James Leung, Redmond, WA (US); Oliver Zheng, Bellevue, WA (US); Andrew Bishop, Bothell, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/479,786

(22) Filed: May 24, 2012

(65) Prior Publication Data

US 2013/0318042 A1     Nov. 28, 2013

(51) Int. Cl.
*G06F 17/30* (2006.01)
(52) U.S. Cl.
CPC .............................. *G06F 17/30091* (2013.01)
(58) Field of Classification Search
USPC ........................................................ 707/610
See application file for complete search history.

(56) References Cited

U.S. PATENT DOCUMENTS

| 5,297,032 A | 3/1994 | Trojan et al. |
| 5,321,750 A | 6/1994 | Nadan |
| 5,339,392 A | 8/1994 | Risberg et al. |
| 5,432,932 A | 7/1995 | Chen et al. |
| 5,819,284 A | 10/1998 | Farber et al. |
| 5,959,621 A | 9/1999 | Nawaz et al. |
| 5,978,543 A | 11/1999 | Murata et al. |
| 6,188,405 B1 | 2/2001 | Czerwinski et al. |
| 6,216,141 B1 | 4/2001 | Straub et al. |
| 6,278,448 B1 | 8/2001 | Brown et al. |
| 6,311,058 B1 | 10/2001 | Wecker et al. |
| 6,449,638 B1 | 9/2002 | Wecker et al. |
| 6,456,334 B1 | 9/2002 | Duhault |
| 6,510,553 B1 | 1/2003 | Hazra |
| 6,708,189 B1 | 3/2004 | Fitzsimons et al. |
| 6,724,403 B1 | 4/2004 | Santoro et al. |

(Continued)

FOREIGN PATENT DOCUMENTS

WO     9926127     5/1999

OTHER PUBLICATIONS

"Demo Project Website", Retrieved at <<http://documentation.magnolia-cms.com/usermanual4/demoprojectwebsite.html>>, Retrieved Date: Feb. 15, 2012, pp. 26.

(Continued)

*Primary Examiner* — Baoquoc N To
(74) *Attorney, Agent, or Firm* — Jessica Meyers; Raghu Chinagudabha; Micky Minhas

(57) ABSTRACT

Techniques to automatically manage file descriptors are described. An apparatus may comprise a processor circuit and a file descriptor application operative on the processor circuit to manage file descriptors for content files, the file descriptor application arranged to receive a file descriptor request from a client application, generate a file descriptor or file descriptor construct information for a content file, and send a file descriptor response with the file descriptor or file descriptor construct information to the client application. Other embodiments are described and claimed.

20 Claims, 12 Drawing Sheets

(56) References Cited

U.S. PATENT DOCUMENTS

| | | |
|---|---|---|
| 6,807,558 B1 | 10/2004 | Hassett et al. |
| 6,832,355 B1 | 12/2004 | Duperrouzel et al. |
| 6,976,210 B1 | 12/2005 | Silva et al. |
| 7,028,264 B2 | 4/2006 | Santoro et al. |
| 7,162,493 B2 | 1/2007 | Weiss et al. |
| 7,188,316 B2 | 3/2007 | Gusmorino et al. |
| 7,376,907 B2 | 5/2008 | Santoro et al. |
| 7,454,711 B2 | 11/2008 | Angiulo et al. |
| 7,469,380 B2 | 12/2008 | Wessling et al. |
| 7,506,306 B2* | 3/2009 | Huang et al. ............... 717/113 |
| 7,568,154 B2 | 7/2009 | Salesin et al. |
| 7,761,791 B2 | 7/2010 | Kobashi et al. |
| 7,809,582 B2 | 10/2010 | Wessling et al. |
| 7,933,632 B2 | 4/2011 | Flynt et al. |
| 7,933,904 B2 | 4/2011 | Nelson |
| 7,987,431 B2 | 7/2011 | Santoro et al. |
| 8,010,885 B2 | 8/2011 | Bodin et al. |
| 8,122,402 B2* | 2/2012 | Tanimoto ............... 716/107 |
| 8,250,150 B2* | 8/2012 | Beck et al. ............... 709/206 |
| 2001/0056370 A1 | 12/2001 | Tafla |
| 2002/0004825 A1 | 1/2002 | Lindberg |
| 2003/0051071 A1 | 3/2003 | Stefansson et al. |
| 2003/0051076 A1 | 3/2003 | Webber |
| 2004/0177058 A1 | 9/2004 | Carpentier et al. |
| 2005/0081043 A1 | 4/2005 | Evans et al. |
| 2005/0198299 A1* | 9/2005 | Beck et al. ............... 709/226 |
| 2005/0273394 A1* | 12/2005 | Schonhals ............... 705/26 |
| 2006/0190833 A1 | 8/2006 | SanGiovanni et al. |
| 2007/0256073 A1* | 11/2007 | Troung et al. ............... 718/1 |
| 2008/0120295 A1 | 5/2008 | Frieder et al. |
| 2008/0155422 A1* | 6/2008 | Manico et al. ............... 715/731 |
| 2008/0250358 A1 | 10/2008 | Mitchem et al. |
| 2008/0256067 A1 | 10/2008 | Nelson |
| 2008/0262922 A1 | 10/2008 | Ahn et al. |
| 2008/0320413 A1 | 12/2008 | Oshiro et al. |
| 2009/0070737 A1* | 3/2009 | Huang et al. ............... 717/105 |
| 2009/0113519 A1 | 4/2009 | Evans et al. |
| 2009/0241074 A1* | 9/2009 | Tanimoto ............... 716/3 |
| 2009/0265349 A1 | 10/2009 | Frieder et al. |
| 2009/0276771 A1 | 11/2009 | Nickolov et al. |
| 2009/0319928 A1 | 12/2009 | Alphin, III et al. |
| 2010/0095239 A1 | 4/2010 | McCommons et al. |
| 2011/0035428 A1 | 2/2011 | Thompson |
| 2011/0137986 A1* | 6/2011 | Wolf ............... 709/204 |
| 2011/0173188 A1 | 7/2011 | Walsh et al. |
| 2011/0225547 A1 | 9/2011 | Fong et al. |
| 2011/0289448 A1* | 11/2011 | Tanaka ............... 715/781 |
| 2012/0054717 A1 | 3/2012 | Huang et al. |
| 2012/0066343 A1 | 3/2012 | Van Vleck et al. |
| 2012/0078966 A1 | 3/2012 | Alpern et al. |
| 2012/0078968 A1 | 3/2012 | Nixon |
| 2012/0311060 A1* | 12/2012 | Beck et al. ............... 709/206 |
| 2014/0025766 A1* | 1/2014 | Beck et al. ............... 709/206 |

OTHER PUBLICATIONS

Stevenson, Karen, "Display Suite: Building Fancy Teasers Without Custom Templates", Retrieved at <<http://www.lullabot.com/articles/display-suite-building-fancy-teasers-without-custom-templates>>, Oct. 4, 2011, pp. 12.

Jacobs, et al., "Adaptive Document Layout via Manifold Content", Retrieved at <<http://research.microsoft.com/pubs/69469/adl-wda.pdf>>, Proceedings of Workshop on Web Document Analysis, Aug. 3, 2003, pp. 25-28.

Samuel, Alexandra, "How to Use Thesis to Customize Your Teasers by Page and Category", Retrieved at <<http://www.alexandrasamuel.com/toolbox/how-to-use-thesis-to-customize-your-teasers-by-page-and-category>>, Retrieved Date: Feb. 14, 2012, pp. 7.

"Introducing the Office (2007) Open XML File Formats", Retrieved at <<http://msdn.microsoft.com/en-us/library/aa338205%28v=office.12%29.aspx>>, Retrieved Date: Feb. 15, 2012, pp. 26.

"Techniques for Generating Custom Objects Representing Content Files", U.S. Appl. No. 13/161,215, filed Jun. 15, 2011, pp. 71.

"Techniques to Manage Universal File Descriptor Models for Content Files", U.S. Appl. No. 13/479,831, filed May 24, 2012, pp. 55.

"Techniques to Modify File Descriptors for Content Files", U.S. Appl. No. 13/479,848, filed May 24, 2012, pp. 65.

Notice of Allowance received for U.S. Appl. No. 13/479,831, mailed Jan. 20, 2015, 5 pages.

* cited by examiner

FIG. 5

*Operational Environment 500*

File Descriptor Assembly Component 122-3

Content File 112
- Content Part 204-1 / CPID 206-1
- Content Part 204-2 / CPID 206-2
- Content Part 204-3 / CPID 206-3
- Content Part 204-c / CPID 206-d File Descriptor Construct Information 132
- File Descriptor Surface 222
  - File Descriptor Tile 224-1
  - File Descriptor Tile 224-2
  - File Descriptor Tile 224-3
- Extracted Content Part 208-1 / CPID 206-1
- Extracted Content Part 208-2 / CPID 206-2
- Extracted Content Part 208-s / CPID 206-3

File Descriptor Model 126-1

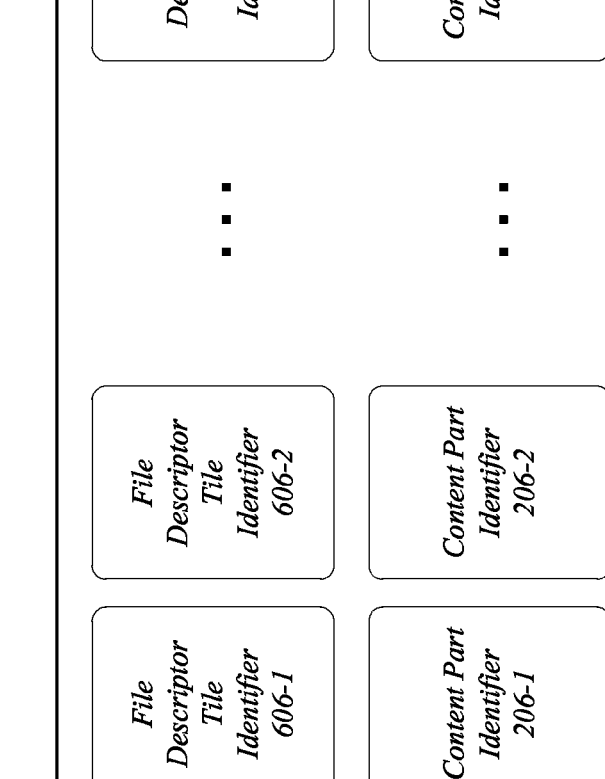
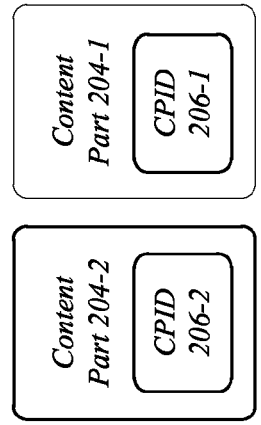
FIG. 6

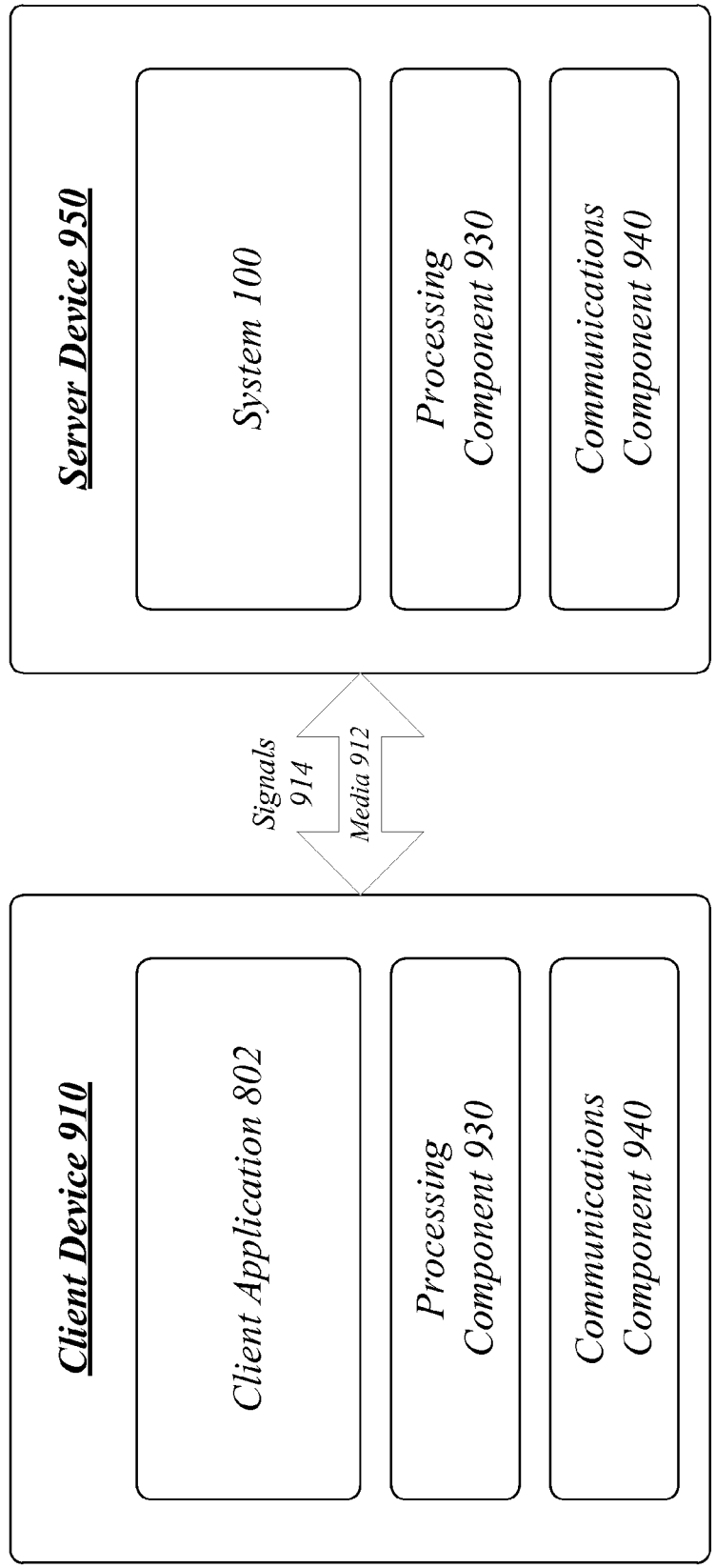

1000

- RECEIVE A FILE DESCRIPTOR REQUEST TO GENERATE A FILE DESCRIPTOR FOR A CONTENT FILE FROM A CLIENT APPLICATION
  *1002*

- RETRIEVE A FILE DESCRIPTOR MODEL FOR THE FILE DESCRIPTOR
  *1004*

- EXTRACT ONE OR MORE CONTENT PARTS FROM THE CONTENT FILE BASED ON THE FILE DESCRIPTOR MODEL
  *1006*

- GENERATE A FILE DESCRIPTOR RESPONSE TO THE FILE DESCRIPTOR REQUEST, THE FILE DESCRIPTOR RESPONSE COMPRISING FILE DESCRIPTOR CONSTRUCT INFORMATION OR THE FILE DESCRIPTOR GENERATED USING THE FILE DESCRIPTOR MODEL AND THE EXTRACTED CONTENT PARTS
  *1008*

- SEND THE FILE DESCRIPTOR RESPONSE TO THE CLIENT APPLICATION
  *1010*

*FIG. 10*

TECHNIQUES TO AUTOMATICALLY MANAGE FILE DESCRIPTORS

BACKGROUND

A computer or server may store thousands of files. As such, it becomes convenient to represent each file with some identifying information, such as a file name, for example. In this way a user may locate a particular file of interest. Over time, various techniques have evolved to represent different types of files more effectively. For instance, movement from text based to graphical based representations allow files to be represented by different icons, with a distinct icon for word processing documents, another distinct icon for a spreadsheet document, and so forth. Each evolution in file representation makes it that much easier for a user to locate a given file.

Recently, however, both online and offline memory storage has made it possible for a single user to store or access many more files than ever before, sometimes by orders of magnitude. To provide finer distinctions between files, conventional file representation techniques have moved to generating file representations using actual content stored within a file. A computer file may store various types of digital media content. For example, a word processing document may include formatted text, numbers, pictures, tables, and so forth. A file representation may now be built using some of the stored content, such as building a file icon with a picture pulled from the file. Despite these innovations, file representation techniques have not kept pace with the increased levels of file storage. As such, it has become increasingly difficult for users to locate a file of interest. It is with respect to these and other considerations that the present improvements have been needed.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques to manage electronic files. Some embodiments are particularly directed to techniques to automatically generate, manage and update file descriptors for electronic files. In one embodiment, for example, an apparatus may comprise a processor circuit and a file descriptor application operative on the processor circuit to manage file descriptors for content files. The file descriptor application may be arranged to receive a file descriptor request from a client application, generate a file descriptor or file descriptor construct information for a content file, and send a file descriptor response with the file descriptor or file descriptor construct information to the client application. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 5 illustrates an embodiment of a second aspect of a third component for a file descriptor application.

FIG. 6 illustrates an embodiment of a third aspect of a third component for a file descriptor application.

FIG. 9 illustrates an embodiment of a distributed system for the system of FIG. 1.

FIG. 10 illustrates a logic flow for the system of FIG. 1.

DETAILED DESCRIPTION

Figure 1:
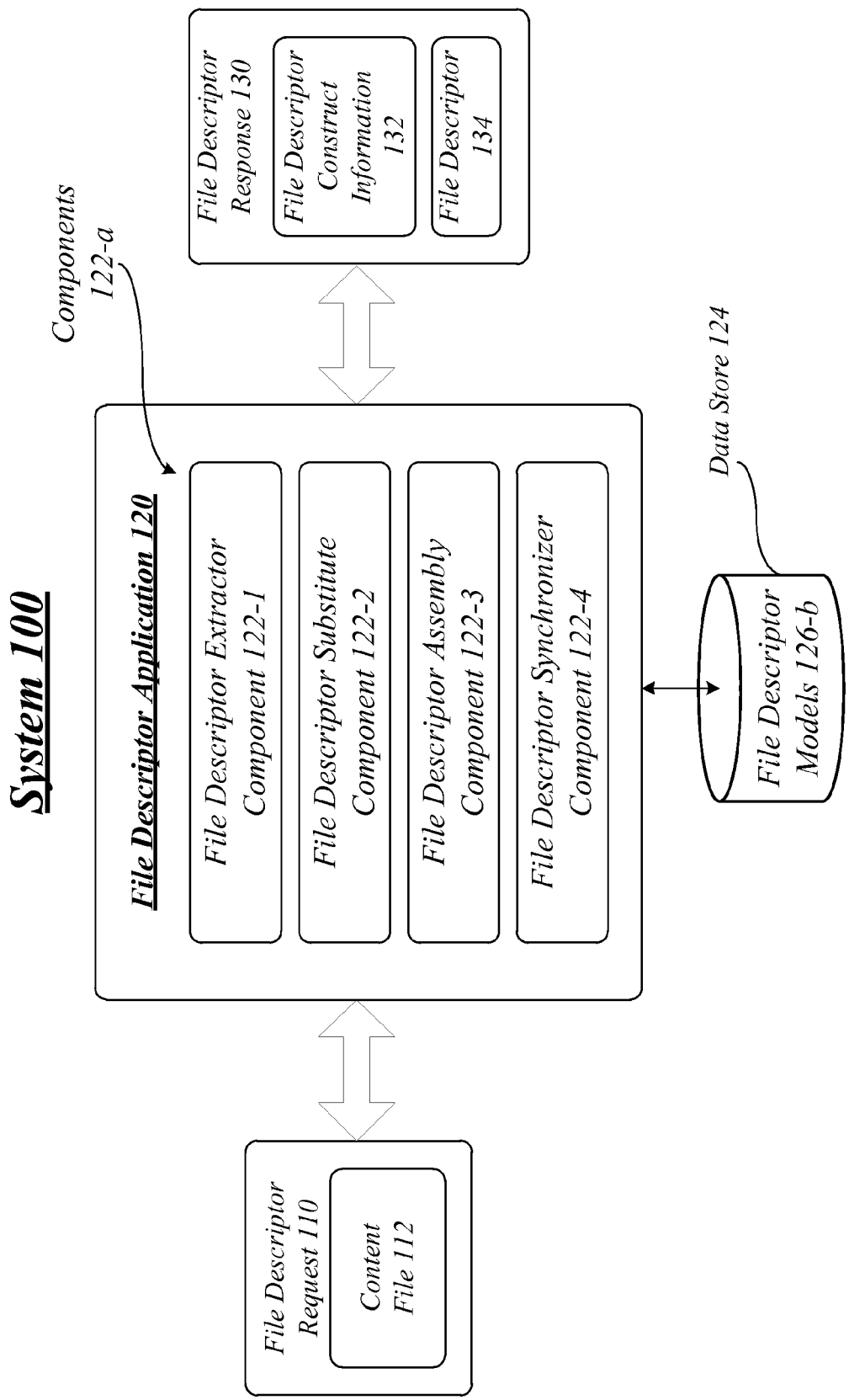
FIG. 1 illustrates an embodiment of a system to manage file descriptors.

Embodiments are directed to techniques to automatically generate, manage and update enhanced file descriptors for electronic files. An electronic file may comprise any physically or logically defined set of digital information. A file descriptor may comprise a user interface element used to represent an electronic file. For instance, a file descriptor for an electronic file may be implemented as a graphical user interface element (e.g., an icon) having a defined size, shape or geometry, along with some descriptive information about an electronic file. A file descriptor may allow a user to differentiate a file from other files, and quickly determine whether a given file is of interest. When this occurs, a user may select a file descriptor to open an electronic file represented by the file descriptor to more closely examine contents of the electronic file.

As previously described, conventional file representation techniques may attempt to build a file descriptor utilizing content from an underlying electronic file. This type of file descriptor may sometimes be informally referred to as a "teaser" or a "thumbnail," as it gives a user a preview of file contents. However, there are several problems associated with these types of file descriptors. For instance, a file descriptor may present random content from a file. In another example, a file descriptor may randomly organize file content. In yet another example, a file descriptor may utilize older and out-of-date templates. In still another example, a file descriptor may include static content. In yet another example, a file descriptor may utilize only content explicitly found in a given file. In still another example, a file descriptor may be generated locally be a client device or operating system. These are merely a few examples of shortcomings associated with conventional file descriptors, and others exist as well.

In an attempt to solve these and other problems, embodiments provide techniques to generate, manage and update an enhanced class of file descriptors. The enhanced file descriptors provide more meaningful information to a user, thereby allowing a user to more easily identify and select a file of interest. The enhanced file descriptors are also dynamic in nature. To the extent an enhanced file descriptor utilizes content from a file, the enhanced file descriptor may be dynamically updated whenever content from the file is updated. In this manner, the enhanced file descriptor may provide relevant and up-to-date information about the underlying file. The enhanced file descriptors may also use translation techniques to transform content from a file from one form (or type) to another form (or type). For instance, tabular data from a spreadsheet may be transformed into a graph for presentation by an enhanced file descriptor. The enhanced file descriptors may also be generated by a network device, server or cloud-based service rather than a local client device or client application. This ensures cost efficient deployment of file descriptor services, compatibility with legacy devices and applications, and access to updated templates and content. As a result, the embodiments can improve affordability, scalability, modularity, extendibility, or interoperability for an operator, device or network.

With general reference to notations and nomenclature used herein, the detailed descriptions which follow may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the appropriate purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the appropriate method steps. A suitable structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates a block diagram for a system 100. In one embodiment, the system 100 may comprise a computer-implemented system 100 having a software application 120 comprising one or more components 122-$a$. Although the system 100 shown in FIG. 1 has a limited number of elements in a certain topology, it may be appreciated that the system 100 may include more or less elements in alternate topologies as desired for a given implementation.

It is worthy to note that "a" and "b" and "c" and similar designators as used herein are intended to be variables representing any positive integer. Thus, for example, if an implementation sets a value for a=5, then a complete set of components 122-$a$ may include components 122-1, 122-2, 122-3, 122-4 and 122-5. The embodiments are not limited in this context.

The system 100 may comprise a file descriptor application 120. The file descriptor application 120 may be generally arranged to automatically generate, manage and/or update an enhanced class of file descriptors for one or more client applications. Although file descriptor application 120 is described as an application program, it may be appreciated that the functions and operations of the file descriptor application 120 may be utilized in any software component, including system programs, middleware programs, firmware programs, web services, and so forth. Furthermore, as discussed in more detail with reference to FIGS. 8, 9, the file descriptor application 120 may be implemented by a client device servicing local client applications, or a network device servicing remote client applications through a network. The latter scenario may be implemented using various web technologies and cloud-computing technologies accessible via any number of client devices and client applications.

The file descriptor application 120 may comprise a file descriptor extractor component 122-1. The file descriptor extractor component 122-1 may be generally arranged to extract portions of multimedia content from a content file 112. Multimedia content may include any digital information element or digital content capable of being stored by a content file 112, such as text, numbers, symbols, images, pictures, video, audio, animations, and so forth. The file descriptor extractor component 122-1 may access the content file 112, for example, from data store 124.

Content file 112 may comprise any digital information element or digital content generated by a software program, such as an application program, a web application, a web service, a client application, a server application, a system program, and so forth. Different software programs may generate different types of digital content. As such, digital content generated by different software programs may comprise heterogeneous digital content. Examples for a content file 112 may include without limitation application files, such as a word processing file, a spreadsheet file, a presentation file, a personal information manager (PIM) file, a database file, a publisher file, a drawing file, a note file, a message file, a project file, and so forth. Further examples for a content file 112 may include multimedia files, such as an audio file, an image file, a video file, an audio/video (AV) file, an animation file, a game file, a markup file, a web page file, a social networking service (SNS) file, and so forth. Other examples of content files 112 may include web pages, social networking site feeds (e.g., Twitter® feeds, FaceBook® feeds, etc.), news feeds (e.g., really simple syndication (RSS) feeds, news aggregation websites and portals, etc.), search engine results, web portal feeds, and other online content types. It may be appreciated that these are merely a few examples of a content file 112, and embodiments are not limited to these examples.

In one embodiment, a content file 112 may comprise a content file for a productivity suite of inter-related client applications, server applications and web services, designed for a particular operating system, such as a MICROSOFT® OFFICE productivity suite for MICROSOFT WINDOWS®, made by Microsoft Corporation, Redmond, Wash. Examples for client applications may include without limitation MICROSOFT WORD, MICROSOFT EXCEL®, MICROSOFT POWERPOINT®, MICROSOFT OUTLOOK®, MICROSOFT ACCESS®, MICROSOFT INFOPATH®, MICROSOFT ONENOTE®, MICROSOFT PROJECT, MICROSOFT PUBLISHER, MICROSOFT SHAREPOINT® WORKSPACE, MICROSOFT VISIO®, MICROSOFT OFFICE INTERCONNECT, MICROSOFT OFFICE PICTURE MANAGER, MICROSOFT SHAREPOINT DESIGNER, and MICROSOFT LYNC. Examples for server applications may include without limitation MICROSOFT SHAREPOINT SERVER, MICROSOFT LYNC SERVER, MICROSOFT OFFICE FORMS SERVER, MICROSOFT OFFICE GROOVE® SERVER, MICROSOFT OFFICE PROJECT SERVER, MICROSOFT OFFICE PROJECT PORTFOLIO SERVER, and MICROSOFT OFFICE PERFORMANCEPOINT® SERVER. Examples for web services may include without limitation MICROSOFT WINDOWS LIVE®, MICROSOFT OFFICE WEB APPLICATIONS, MICROSOFT OFFICE LIVE, MICROSOFT LIVE MEETING, MICROSOFT OFFICE PRODUCT WEB SITE, MICROSOFT UPDATE SERVER, and MICROSOFT OFFICE 365. The embodiments are not limited to these examples.

The file descriptor application 120 may comprise a file descriptor substitute component 122-2. The file descriptor substitute component 122-2 may be generally arranged to replace, translate, transform, or otherwise substitute one type of content stored by a content file 112 for another type of content. For instance, a content file 112 for a spreadsheet application may store data in a tabular form. The file descriptor substitute component 122-2 may transform the tabular data into a graph representing the tabular data. The graph may then be used to build a file descriptor 134 representative of the content file 112. In another example, a content file 112 for a word processing application may store "dog" in text form. The file descriptor substitute component 122-2 may transform the text "dog" into a picture, image or animation of a dog. The picture may then be used to build a file descriptor 134 representative of the content file 112.

The file descriptor application 120 may comprise a file descriptor assembly component 122-3. The file descriptor assembly component 122-3 may be generally arranged to generate, construct or otherwise assemble file descriptor construct information 132 and/or a file descriptor 134 utilizing one or more content parts from a content file 112 extracted by the file descriptor extractor component 122-1 as originally found in the content file 112 or as substituted by the file descriptor substitute component 122-2.

In order to properly assemble file descriptor construct information 132 or a file descriptor 134, the file descriptor assembly component 122-3 may utilize a file descriptor model 126-b stored by the data store 124 to generate the file descriptor construct information 132 and/or file descriptor 134. A file descriptor model 126-b may comprise a template for building or generating a file descriptor 134. A file descriptor model 126-b may define a set of extraction rules regarding what content to extract from a content file 112, a set of formatting rules specifying a format, layout or positions of extracted content, a set of presentation rules controlling how extracted content is presented to a user (e.g., font, font size, bold, underline, italics, styles, etc.), a set of transform rules detailing when and how to transform extracted content, and other rules defining how a custom file descriptor 134 can be generated. Different file descriptor models 126-b may be defined for different types of content files 112. For instance, a first file descriptor model 126-1 may define how a file descriptor 134 can be generated for a word processing document, while a second file descriptor model 126-2 may define how a file descriptor cab be generated for a spreadsheet document, and so forth. In another example, third and fourth descriptor models 126-3, 126-4 may be two alternative models for a single presentation document. The embodiments are not limited to a number or type of file descriptor models 126-b, and they may vary according to implementation.

The file descriptor application 120 may comprise a file descriptor synchronizer component 122-4. The file descriptor synchronizer component 122-4 may be generally arranged to synchronize changes made to content parts of a content file 112 with corresponding content parts used for a file descriptor 134. For instance, if a file descriptor 134 utilizes a picture from a content file 112, and the picture in the content file 112 is updated with a new picture, the file descriptor synchronizer component 122-4 will automatically detect the change and update the file descriptor 134 with the new picture. This may be accomplished in part, as further described below, by uniquely identifying each content part commonly used by a content file 112 and a file descriptor 134.

Figure 11:
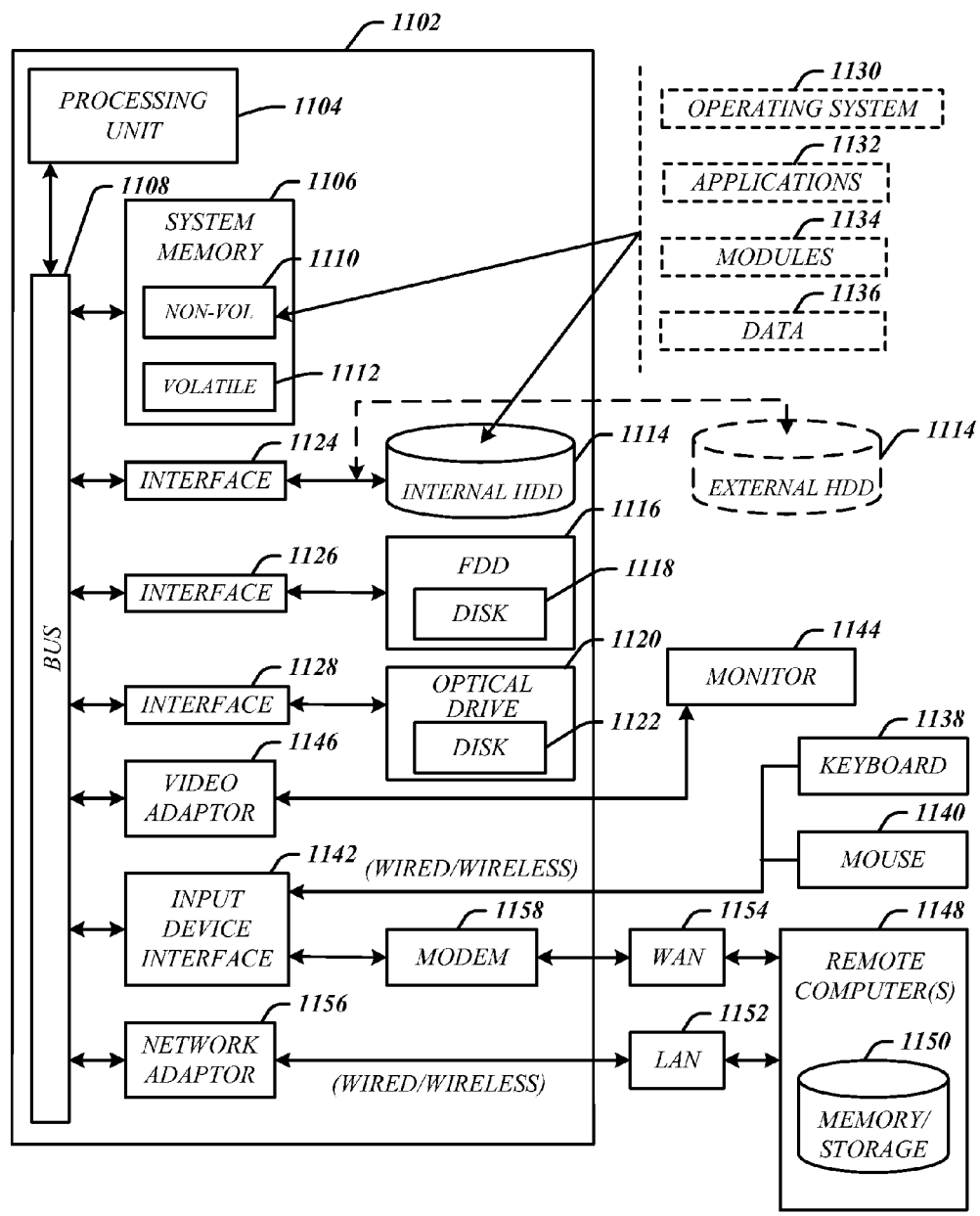
FIG. 11 illustrates an embodiment of a computing architecture.

In general operation, the file descriptor application 120 may be operative on a processor circuit (as shown in FIG. 11) to manage file descriptors 134 for content files 112. The file descriptor application 120 may be arranged to receive a file descriptor request 110 from a client application (as shown in FIG. 9), generate a file descriptor 134 or file descriptor construct information 132 for a content file 112, and send a file descriptor response 130 with the file descriptor 134 or file descriptor construct information 132 to the client application. An entity of a client device (e.g., the client application, operating system, local file descriptor application, etc.) may then use the file descriptor construct information 132 to generate the file descriptor 134, or use the file descriptor 134 received with the file descriptor response 130, to represent the content file 112 on the client device.

Figure 2:
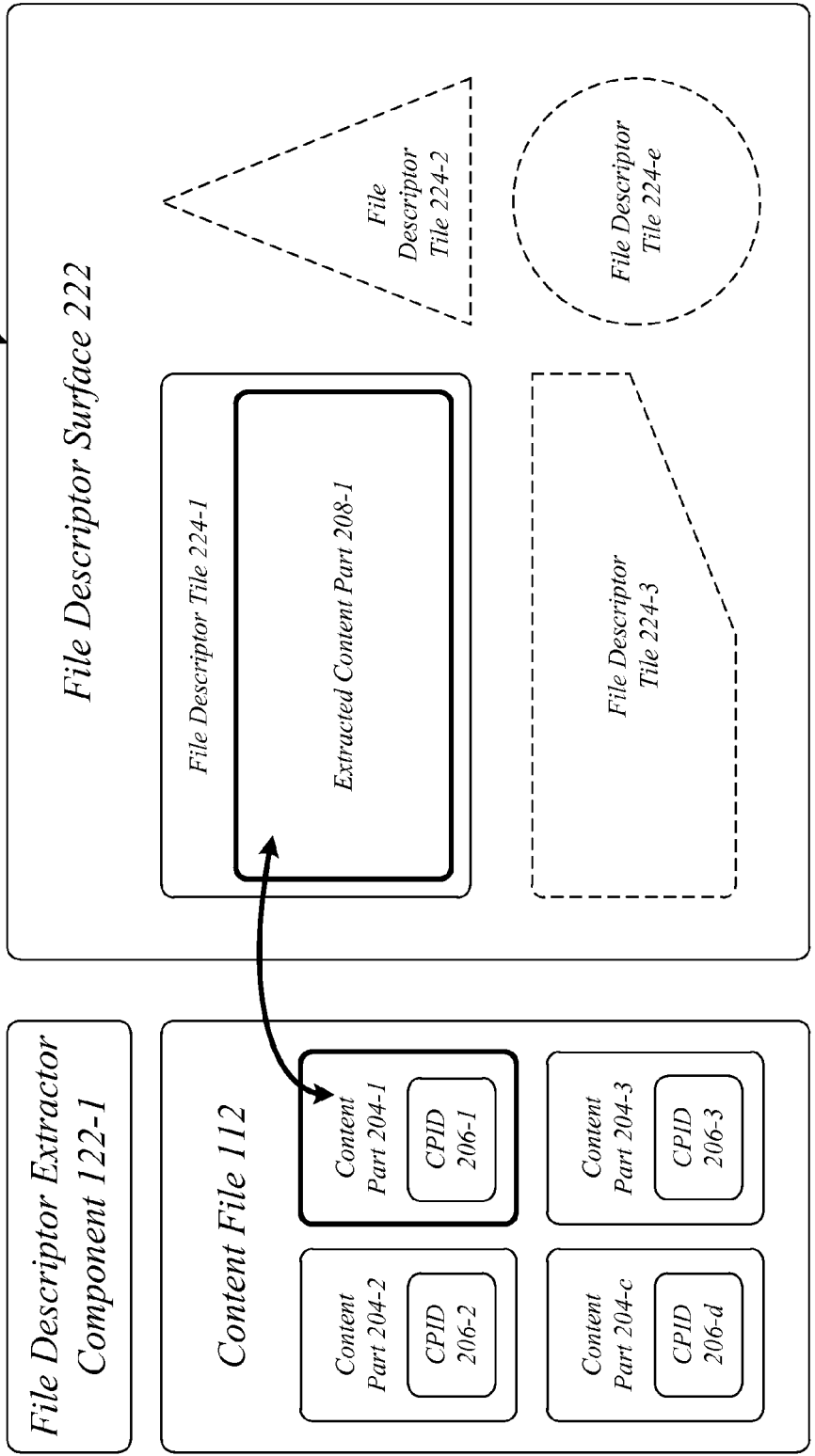
FIG. 2 illustrates an embodiment of a first component for a file descriptor application.

FIG. 2 illustrates an embodiment of an operational environment 200 for the system 100. More particularly, operational environment 200 illustrates exemplary operations for the file descriptor extraction component 122-1.

As described with reference to FIG. 1, the file descriptor application 120 may comprise the file descriptor extractor component 122-1. The file descriptor extractor component 122-1 may be operative to retrieve a file descriptor model 126-b from the data store 124 to generate a file descriptor 134. A particular file descriptor model 126-b, such as file descriptor model 126-1, may be retrieved for a number of different reasons. For example, the file descriptor model 126-1 may be retrieved based on a file type for a content file 112, a client application originating a file descriptor request 110, or a client device hosting the client application, among other factors.

The file descriptor extractor component 122-1 may extract one or more content parts 204-c from the content file 112 based on the file descriptor model 126-1. A content part 204-c is any discrete or defined set of digital information stored by the content file 112. As previously described, a content file 112 may comprise digital information. The digital information may be physically or logically grouped based on a number of factors, such as proximity, content type (e.g., text, pictures, graphs, etc.), content formatting (e.g., sentences, paragraphs, sections, chapters, etc.), and so forth. Additionally or alternatively, a content part 204-c may comprise information associated with a content file 112, such as a file name, file path, metadata, descriptors, properties, attributes, and so forth. As used herein, a content part 204-c that has been extracted from a content file 112 may be referred to as an extracted content part 208-s. For instance, a content part 204-1 may be referred to as an extracted content part 208-1 after extraction operations are performed.

The file descriptor model 126-1 may include a file descriptor surface 222. A file descriptor surface 222 may comprise a two-dimensional (2D) or three-dimensional (3D) topological space of any defined size having a coordinate system and boundaries. The file descriptor surface 222 may generally have a size that is smaller than a presentation surface for a content file 112. Examples for a presentation surface used by a content file 112 may include without limitation a document for a word processing program, a slide for a presentation program, a worksheet for a spreadsheet program, a note for a note program, a contact card for a personal information manager (PIM), and other spaces typically used by application programs. In one embodiment, for example, a file descriptor surface 222 may have a size equal to a 200×200 pixel space of an output device, such as an electronic display.

The file descriptor surface 222 may include various file descriptor tiles 224-e defined or disposed on the file descriptor surface 222 in a certain topology. A file descriptor tile 224-e may comprise a defined region of the file description surface 222 designated for presenting a discrete set of information, such as a content part 204-c or extracted content part 208-s. A defined region may be of any size, dimension or shape as desired for a given implementation. A given file descriptor surface 222 may have any number of file descriptor tiles 224-e, and each file descriptor tile 224-e may have a set of definitions (e.g., size, shape, dimension, geometry) to ensure that all the file descriptor tiles 224-e fit within a given size for a file descriptor surface 222. Definitions for file descriptor tiles 224-e may dynamically change based on a file descriptor surface 222, set of content parts 204-c or extracted content parts 208-s, associations between content parts 204-c or extracted content parts 208-s and a file descriptor tile 224-e, properties for a display, properties for a device, user preferences, and other factors. The embodiments are not limited in this context.

The extracted content parts 208-s may be inserted into the various file descriptor tiles 224-e of the file descriptor model 126-1 during assembly operations, as described further below. As shown in FIG. 2, once the file descriptor extraction component 122-1 extracts a content part 204-1 from the content file 112, the file descriptor assembly component 122-3 may insert the extracted content part 204-1 into a corresponding file descriptor tile 224-1 of the file descriptor surface 222. This may continue with content part 204-2 into file descriptor tile 224-2, and so forth, until the file descriptor surface 222 has been completely filled, there is no remaining content parts 204-c of the content file 112, timer expiration, or some other terminating condition occurs.

In order to extract proper content parts 204-c of the content file 112, the file descriptor extraction component 122-1 may utilize instructions, rules or algorithms provided by the file descriptor model 126-1. Additionally or alternatively, the file descriptor extraction component 122-1 may utilize a proprietary content extraction algorithm designed for the file descriptor application 120.

A content extraction algorithm may contain a set of rules pertaining to types of information to retrieve from the content file 112. Different content extraction algorithms may be utilized for different file types. By way of example and not limitation, a content extraction algorithm designed to extract content parts 204-c from a content file 112 comprising a word processing document may be described. It may be appreciated, however, that a different content extraction algorithm may be designed for different file types using similar principles as desired for a given implementation. The embodiments are not limited in this context.

In one embodiment, for example, the content extraction algorithm may utilize three classes of information and associated rules, including a content and properties class (e.g., paragraphs or properties) from the content file 112, a content objects class (e.g., image, embedded object) for the content file 112, and a content pages class within the content file 112, or some combination thereof. It may be appreciated that any number of classes or categories may be defined for a given content file type.

In one embodiment, examples for the content and properties class may be illustrated in TABLE 1 as follows:

TABLE 1

| Content/Property | Description |
| --- | --- |
| Title (property) | The title property of a document |
| Abstract | The abstract of a document |
| Filename | The filename of the document |
| Author | The author of the document |
| Title (1$^{st}$ instance of title style) | The first paragraph with Title style applied |
| First N Body Paragraphs | The first N body paragraphs within the document |
| First N Headings | The first N paragraph headings used within the document |

In one embodiment, examples for the content objects class may be illustrated in TABLE 2 as follows:

TABLE 2

| Object | Description |
| --- | --- |
| 1$^{st}$ Image (not in table) | The first image within the document that is not in a table<br>Image is filled and centered within the tile |
| 1$^{st}$ Image (filled and centered) | The first image within the document<br>Image is filled and centered within the tile |
| 1$^{st}$ Table | The first table within the document<br>Table image is clipped to fit within the tile<br>For a table that contains LTR language clipping will start at a top left corner of table<br>For a table that contains RTL language clipping will start at top right corner of table |
| 1$^{st}$ SmartArt ® (filled and centered) | The first SmartArt graphic within the document<br>SmartArt image is filled and centered within the tile |
| 1$^{st}$ Chart (filled and centered) | The first chart within the document<br>Chart image is filled and centered within the tile |
| Table of Contents (TOC) (Web Layout) | The first TOC, as it appears in web layout, within the document |
| 1$^{st}$ SmartArt (shrunk) | The first SmartArt graphic within the document<br>SmartArt image is shrunk and then centered to fit within the tile |

TABLE 2-continued

| Object | Description |
|---|---|
| 1st Chart (shrunk) | The first chart graphic within the document Chart image is shrunk and then centered to fit within the tile |
| 1st Equation | The first equation within the document |
| TOC (Print Layout) | The first TOC, as it appears in print layout, within the document. The TOC will be clipped to fit the dimension of the tile |

In one embodiment, examples for the content pages class may be illustrated in TABLE 3 as follows:

TABLE 3

| Page | Description |
|---|---|
| 1st Page (Print Layout + shrunk) | The 1st page (non-cover page) in the document as represented in Print Layout The image is shrunk and then centered to fit within the tile |
| 1st Page (Web Layout) | The 1st page (non-cover page) in the document as represented in Web Layout |
| Cover Page (Print Layout + shrunk) | The 1st cover page in the document as represented in Print Layout The image is shrunk and then centered to fit within the tile |
| 1st Page (Print Layout) | The 1st page (non-cover page) in the document as represented in Print Layout The image is filled and centered within the tile |
| Cover Page (Print Layout) | The 1st cover page in the document as represented in Print Layout The image is filled and centered with the tile |
| Cover Page (Web Layout) | The 1st cover page in the document as represented in Web Layout |

The content extraction algorithm may be used to retrieve a content part 204-c from the content file 112 stored by the data store 124. The file descriptor assembly component 122-3 may then organize and format the extracted content parts 204-c in order to generate the file descriptor 134. For instance, a rule for the content extraction algorithm may state that any text retrieved from within the document, such as the first N paragraphs, will retain style formatting as specified within a document. Another rule may be that content properties that are not actual text within a document will be formatted as Normal style as defined within the document. Yet another rule may be that if the entire text of the content part 204-c cannot fit within the dimensions of a file descriptor tile 224-e then an ellipsis " . . . " will be appended at the end of the text. These are merely some exemplary rules, and others are possible. The embodiments are not limited in this context.

In some cases, the content extraction algorithm may define a set of rules to create the file descriptor 134 from a combination of a content and properties class, a content object class, and a content page class, sometimes referred to informally as a "mashup." This provides for a highly customized file descriptor 134 constructed to represent content of the content file 112.

In one embodiment, examples for different class combinations may be illustrated in TABLE 4 as follows:

TABLE 4

| Class Combination | Description |
|---|---|
| Title + author + First N paragraphs | The title on one line, then author, then the first N body paragraphs that can fit within the tile |
| Title + author | The title on one line and then author |
| Title + First N paragraphs | The title on one line, and then the first N body paragraphs that can fit within the tile |
| Filename + author + First N paragraphs | If no title, then use the filename on one line, then author, then the first N body paragraphs that can fit within the tile |
| Filename + author | If no title, then use the filename on one line, and then author |
| Filename + First N paragraphs | If no title, then use the filename on one line, and then the first N body paragraphs that can fit within the tile |
| Title + 1st image (not in table) | The title on one line and then the 1st image, which is not in a table |
| Filename + 1st image (not in table) | If no title, then use the filename on one line, and then the 1st image, which is not in a table |

The content extraction algorithm may also provide rules limiting the file descriptor 134 to a single class or type within a class. For instance, a rule may be defined to only use content in the form of text from the content file 112, or content objects in the form of images for the content file 112.

The content extraction algorithm may still further provide rules to generate a list of multiple versions of the file descriptor 134 for presentation to a user for final selection. For instance, a rule may generate P versions of the file descriptor 134, with P representing any positive integer (e.g., P=10). A list of multiple versions of the file descriptor 134 may be generated in accordance with examples given in TABLE 5 as follows:

TABLE 5

| Tile Object Version | Class |
|---|---|
| Title + author + First N paragraphs | Class Combination |
| Filename + author + First N paragraphs | Class Combination |
| Title + First N paragraphs | Class Combination |
| Filename + First N paragraphs | Class Combination |
| Title + 1st image (not in table) | Class Combination |
| Filename + 1st image (not in table) | Class Combination |
| Title + author | Class Combination |
| Filename + author | Class Combination |
| 1st Page (Print Layout) | Page |
| Cover Page (Print Layout) | Page |
| 1st Page (Web Layout) | Page |
| Cover Page (Print Layout + shrunk) | Page |
| Abstract | Content/Property |
| Title (property) | Content/Property |
| First N Body Paragraphs | Content/Property |
| Filename | Content/Property |
| 1st Image (filled and centered) | Content Object |
| 1st Chart (filled and centered) | Content Object |
| 1st SmartArt (filled and centered) | Content Object |
| TOC (Web Layout) | Page |
| 1st Table | Content Object |
| 1st Image (not in table) | Content Object |
| 1st Chart (shrunk) | Content Object |
| 1st SmartArt (shrunk) | Content Object |
| 1st Equation | Content Object |
| Title (1st instance of title style) | Content/Property |
| 1st Page (Print Layout + shrunk) | Page |
| Cover Page (Web Layout) | Page |
| TOC (Print Layout) | Content Object |
| Author | Content/Property |
| First N Headings | Content/Property |

Sometime before, during or after extraction operations, the file descriptor extractor component 122-1 may assign each of the content parts 204-c or extracted content parts 208-s of a content file 112 with a content part identifier 206-d. Alternatively, each content part 204-c of a content file 112 may come pre-assigned with content part identifiers 206-d. A content part identifier 206-d uniquely identifies a corresponding extracted content part 208-s. Furthermore, each of the extracted content parts 208-s corresponds to a file descriptor tile 224-e of a file descriptor surface 222 of the file descriptor 134. In this manner, when a change is made to a content part 204-c as stored by the content file 112, the file descriptor synchronizer component 122-4 may identify a corresponding extracted content part 208-s used by the file descriptor 134 in order to perform update operations to the file descriptor 134.

Figure 3:
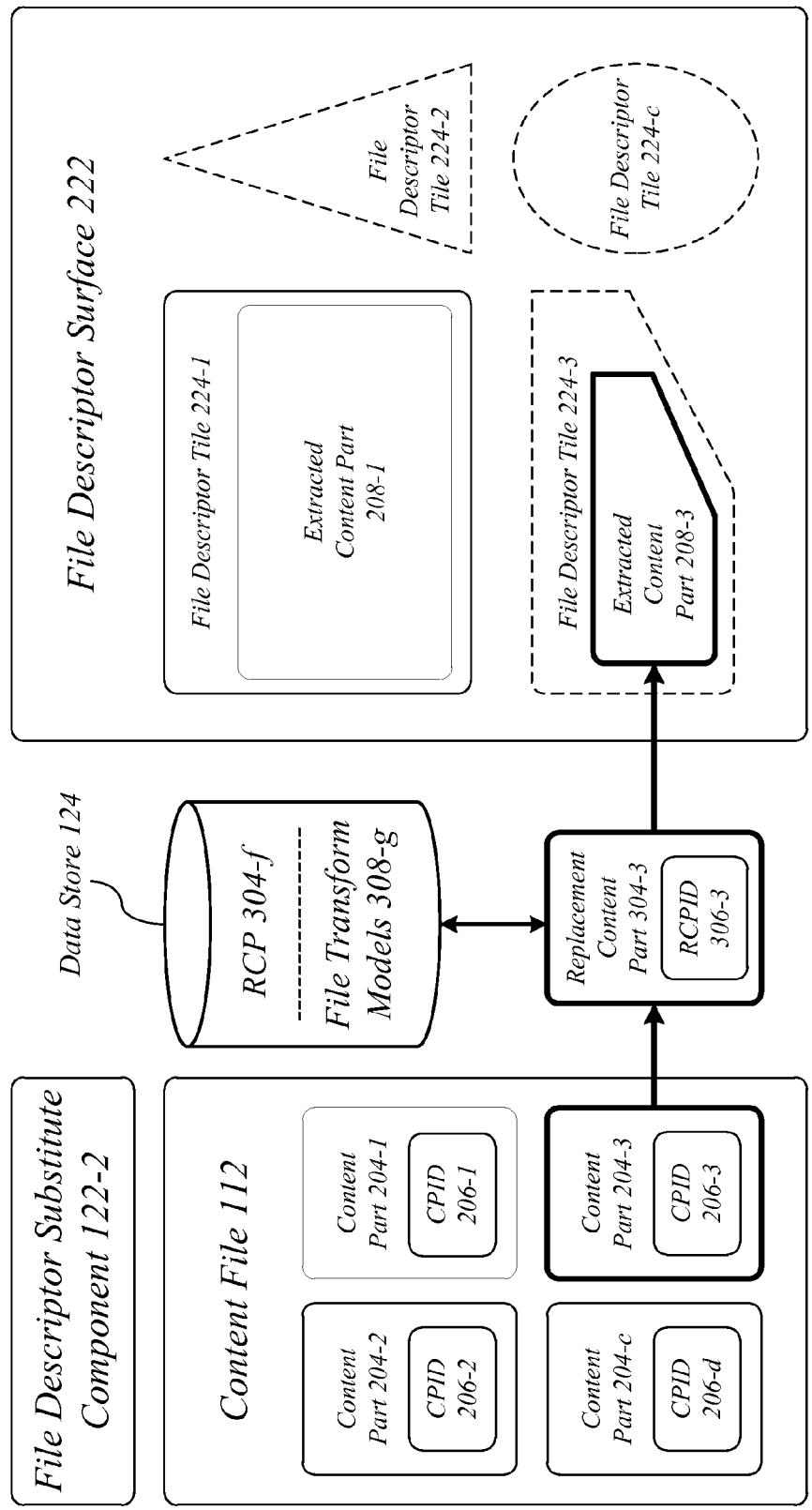
FIG. 3 illustrates an embodiment of a second component for a file descriptor application.

FIG. 3 illustrates an embodiment of an operational environment 300 for the system 100. More particularly, operational environment 300 illustrates exemplary operations for the file descriptor substitute component 122-2.

As previously described with reference to FIG. 1, the file descriptor application 120 may comprise the file descriptor substitute component 122-2. The file descriptor substitute component 122-1 may be operative to substitute a content part 204-c from a content file 112 with a replacement content part 304-f to form an extracted content part 208-s. A replacement content part 304-f may comprise a content part that is used as a substitute, replacement or alternative to a content part 204-c.

In one embodiment, a replacement content part 304-f may be a static part previously created and stored by a data source. In this case, the file descriptor substitute component 122-2 may select a stored replacement content part 304-f appropriate for an extracted content part 204-c. Examples of suitable data sources for a replacement content part 304-f may include without limitation another content part 204-c from a same or different content file 112, replacement content parts 304-f stored by the data store 124, or some other data source.

In one embodiment, a replacement content part 304-f may be automatically and dynamically generated from an extracted content part 204-c. In order to dynamically generate replacement content parts 3041, the file descriptor substitute component 122-2 may utilize instructions, rules or algorithms provided by a file transform model 308-g. A file transform model 308-g may be designed for different content files 112, content parts 204-c of a content file 112, a content type, a content format, a client application, and so forth.

In operation, assume a file transform model 308-1 is specifically designed for a spreadsheet application. Further assume the file descriptor extractor component 122-1 extracts a content part 204-3 from a content file 112 for a spreadsheet application. The file descriptor extraction component 122-1 detects that the content part 204-3 is tabular data. The file descriptor extraction component 122-1 may notify the file descriptor substitute component 122-2. The file descriptor substitute component 122-2 may retrieve a replacement content part 304-3 or a file transform model 308-1 from the data store 124. In the former case, the file descriptor substitute component 122-2 may substitute the content part 204-3 with the stored replacement content part 304-3. In the latter case, the file descriptor substitute component 122-2 may generate the replacement content part 304-3 from the content part 204-3 using the file transform model 308-1. The file transform model 308-1 may include a set of rules or program instructions to transform the tabular data to a bar graph. The file descriptor substitute component 122-2 may substitute the content part 204-3 with the generated replacement content part 304-3. The replacement content part 304-3 becomes the extracted content part 208-3. The bar graph may then be used to build a file descriptor 134 representative of the content file 112.

Figure 4:
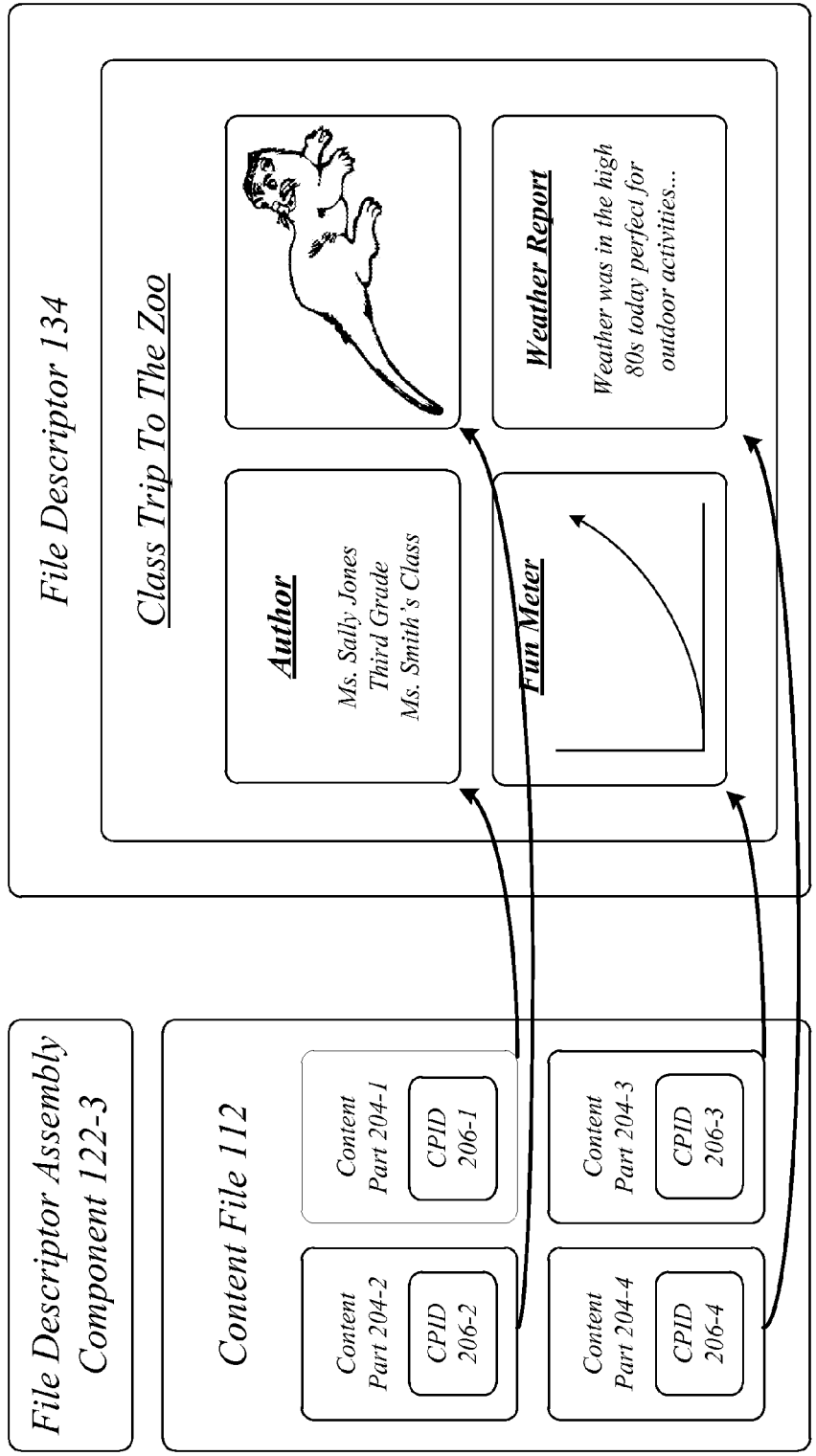
FIG. 4 illustrates an embodiment of a first aspect of a third component for a file descriptor application.

FIG. 4 illustrates an embodiment of an operational environment 400 for the system 100. More particularly, operational environment 400 illustrates exemplary operations for the file descriptor assembly component 122-3 when assembling a file descriptor 134.

The file descriptor assembly component 122-3 may be operative to generate a file descriptor 134 from one or more extracted content parts 208-s from a content file 112 based on a file descriptor model 126-b. The file descriptor assembly component 122-3 may take the extracted content parts 208-s and any replacement content parts 304-f and insert them into the appropriate file descriptor tile 224-e. To assist in assembly, the file descriptor assembly component 122-3 may receive as input information about a file descriptor tile 224-e from a file descriptor model 126-b. The information may comprise such information as a location, size, shape, dimension, geometry, boundaries, adjacent file descriptor tiles 224-e, adjoining file descriptor tiles 224-e, and so forth. For instance, if an extracted content part 208-s is too large for current dimensions of a file descriptor tile 224-1, the file descriptor assembly component 122-3 may use information about adjacent or adjoining file descriptor tiles 224-2, 224-3 to determine whether the current dimensions for the file descriptor tile 124-1 may be increased to accommodate the larger part, and the current dimensions for the file descriptor tiles 224-2, 224-3 may be decreased accordingly. The file descriptor assembly component 122-3 may implement various fitting algorithms to accommodate such cases.

FIG. 5 illustrates an embodiment of an operational environment 500 for the system 100. More particularly, operational environment 500 illustrates exemplary operations for the file descriptor assembly component 122-3 when assembling file descriptor construct information 132.

In addition to assembling an actual file descriptor 134, the file descriptor assembly component 122-3 may be operative to generate file descriptor construct information 132 for use by a client application (or other entity) to generate a file descriptor 134 for a content file 112.

In one embodiment, the file descriptor construct information 132 may include all information needed to assemble a file descriptor 134. For example, the file descriptor construct information 132 may comprise a file descriptor model 126-b with a file descriptor surface 222 and one or more file descriptor tiles 224-e arranged to present one or more extracted content parts 208-s from the content file 112. The file descriptor construct information 132 may further comprise the actual extracted content parts 204-c.

Once assembled, the file descriptor application 120 may then send the file descriptor construct information 132 to a local client application or a remote client application. The local or remote client application may use the received file descriptor construct information 132 to generate a file descriptor 134 for the content file 112.

FIG. 6 illustrates an embodiment of an operational environment 600 for the system 100. More particularly, operational environment 600 illustrates exemplary operations for the file descriptor assembly component 122-3 when assembling file descriptor construct information 132.

As described with reference to FIG. 5, the file descriptor assembly component 122-3 may be operative to generate file descriptor construct information 132 for use by a client application (or other entity) to generate a file descriptor 134 for a content file 112. In one embodiment, the file descriptor construct information 132 may include only partial information needed to assemble a file descriptor 134. The client application may have access to any additional information needed to assemble the file descriptor 134, such as the content file 112.

As shown in FIG. 6, the file descriptor construct information 132 may comprise a file descriptor model identifier 604, at least one file descriptor tile identifier 606-*h* to identify a file descriptor tile 224-*e* on a file descriptor surface 222 of a file descriptor model 126-*b*, and at least one content part identifier 206-*d* to identify a content part 204-*c* of the content file 112 corresponding to the file descriptor tile 224-*e* identified by the file descriptor tile identifier 606-*h*.

Alternatively, the file descriptor construct information 132 may be limited to just a file descriptor model 126-*b* or a file descriptor model identifier 604. The former case may be desirable, for example, when the file descriptor application 120 is implemented in a client-server environment, where client devices include client applications that may not have access to, or be updated with, a latest set of file descriptor models 126-*d*. In this case, the file descriptor construct information 132 may include a latest file descriptor model 126-*b* suitable for a given content file 112. The latter case may be desirable, for example, to reduce network traffic or for low bandwidth connections between a server device and a client device.

Once assembled, the file descriptor application 120 may then send the file descriptor construct information 132 to a local client application or a remote client application. The local or remote client application may use the received file descriptor construct information 132 to generate a file descriptor 134 for the content file 112. For instance, the client application may match the content part identifiers 206-*d* embedded in the received file descriptor construct information 132 to content part identifiers 206-*d* in the content file 112. The client application may utilize a client version of the file descriptor application 120 to extract and assemble the content parts 204-*c* with matching content part identifiers 206-*d*.

Figure 7:
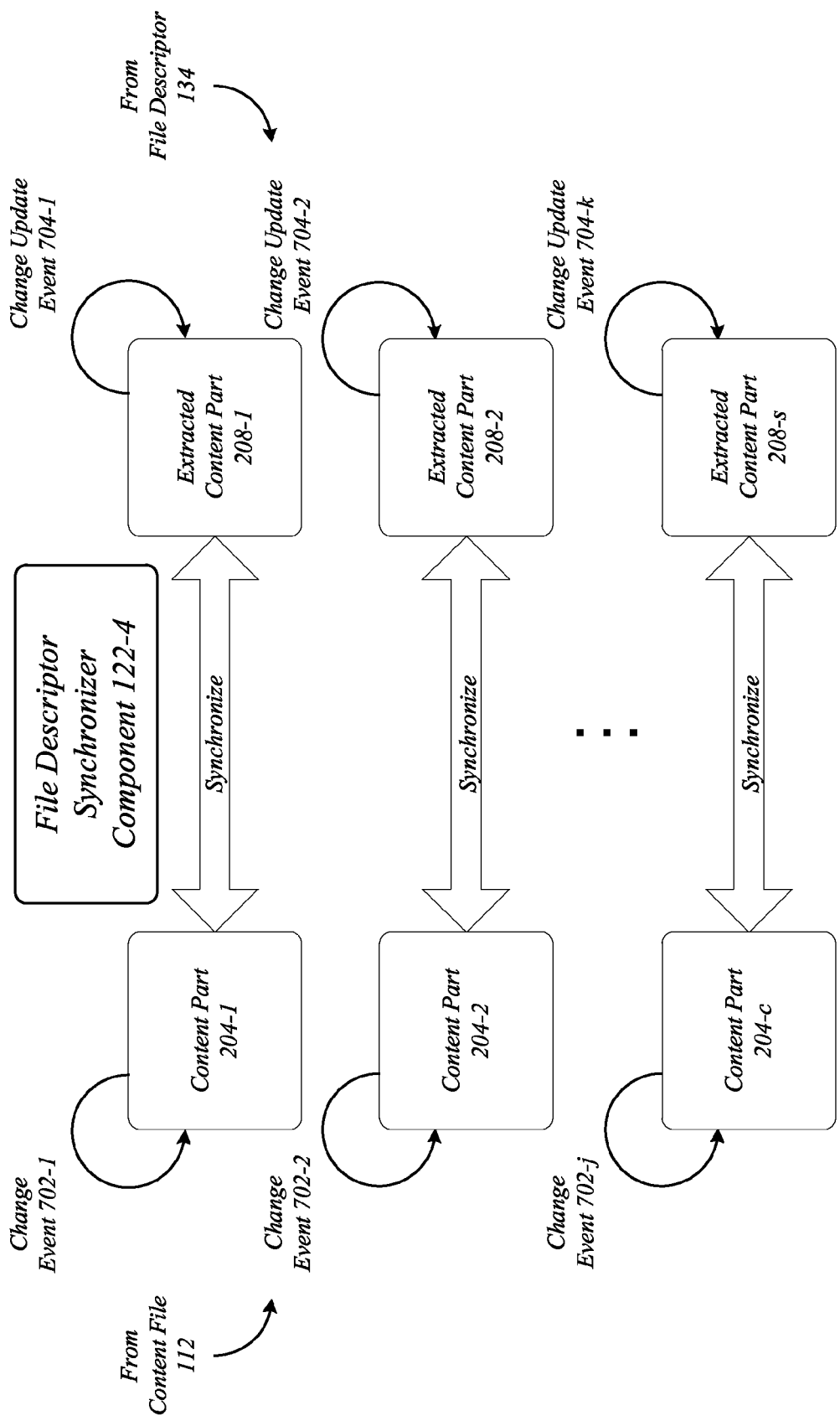
FIG. 7 illustrates an embodiment of a fourth component for a file descriptor application.

FIG. 7 illustrates an embodiment of an operational environment 700 for the system 100. More particularly, operational environment 700 illustrates exemplary operations for the file descriptor synchronizer component 122-4 when synchronizing content parts 204-*c* in a file descriptor 134.

The file descriptor synchronizer component 122-4 may be operative to synchronize changes to content parts 204-*c* of a content file 112 with corresponding extracted content parts 208-*s* of the content file 112 of a file descriptor 134. This may be performed using a push model or a pull model.

In a push model, a change event 702-*j* may occur for a content part 204-*c* of a content file 112. A change event 702-*j* may comprise any modification made to a content part 204-*c*, such as a content change, a format change, a style change, content editing, content deletion, and so forth. The file descriptor synchronizer component 122-4 detects the change event 702-*j* (or is notified), and initiates synchronization operations to synchronize any changes made to a content part 204-*c* with a corresponding extracted content part 208-*s* of a file descriptor 134. For instance, assume a file descriptor includes an extracted content part 208-1 that corresponds to a content part 204-1 of a content file 112. Further assume, the content part 204-1 is a phrase such as "Class Trip To The Zoo" without underlining. Still further assume a user changes a format of the content part 204-1 from "Class Trip To The Zoo" to "ClassTripToTheZoo." This change comprises a change event 702-1. The file descriptor synchronizer component 122-4 may detect the change event 702-1 by periodically monitoring a private or public storage location for the content file 112. Alternatively, a client application may notify the file descriptor synchronizer component 122-4 of the change event 702-1. Once aware of the change event 702-1, the file descriptor synchronizer component 122-4 may push changes to the client application (or some other entity), which in turn performs a change update event 704-1 for the extracted content part 208-1 of the file descriptor 134 so that the content part 204-1 and the extracted content part 208-1 are substantially identical to each other. Similarly, a change event 702-2 for a content part 204-2 may cause a change update event 704-2 for an extracted content part 208-2. Synchronization operations may continue for other change events 702-*j* in a similar manner.

Rather than using a push model to push changes to a client application, the file descriptor synchronizer component 122-4 may instead use a pull model where it sends a request to the client application to generate a new file descriptor 134. The client application may then send a new file descriptor request 110 with the updated content file 112, and the file descriptor application 120 may generate a new file descriptor 134 in response to the new file descriptor request 110. In this sense, the client application "pulls" changes utilizing the file descriptor synchronizer component 122-4.

Another example of a pull model may include the use of certain triggers to identify times when a new file descriptor request 110 is to be sent. Examples of triggers could be periodic triggers based on timers, on-demand triggers (e.g., user request), or event-based triggers based on user actions detected by a client device or client application. For example, a timer may be used to automatically request updates to a file descriptor 134 on a periodic basis. In another example, a user may manually request updates to a file descriptor 134. In yet another example, a client application may detect when changes are made to a content file 112, and use the changes as an event-based trigger to generate a new file descriptor request 110. The file descriptor synchronizer component 122-4 may update specific extracted content parts 208-*s*, or an entire file descriptor 134.

Figure 8:
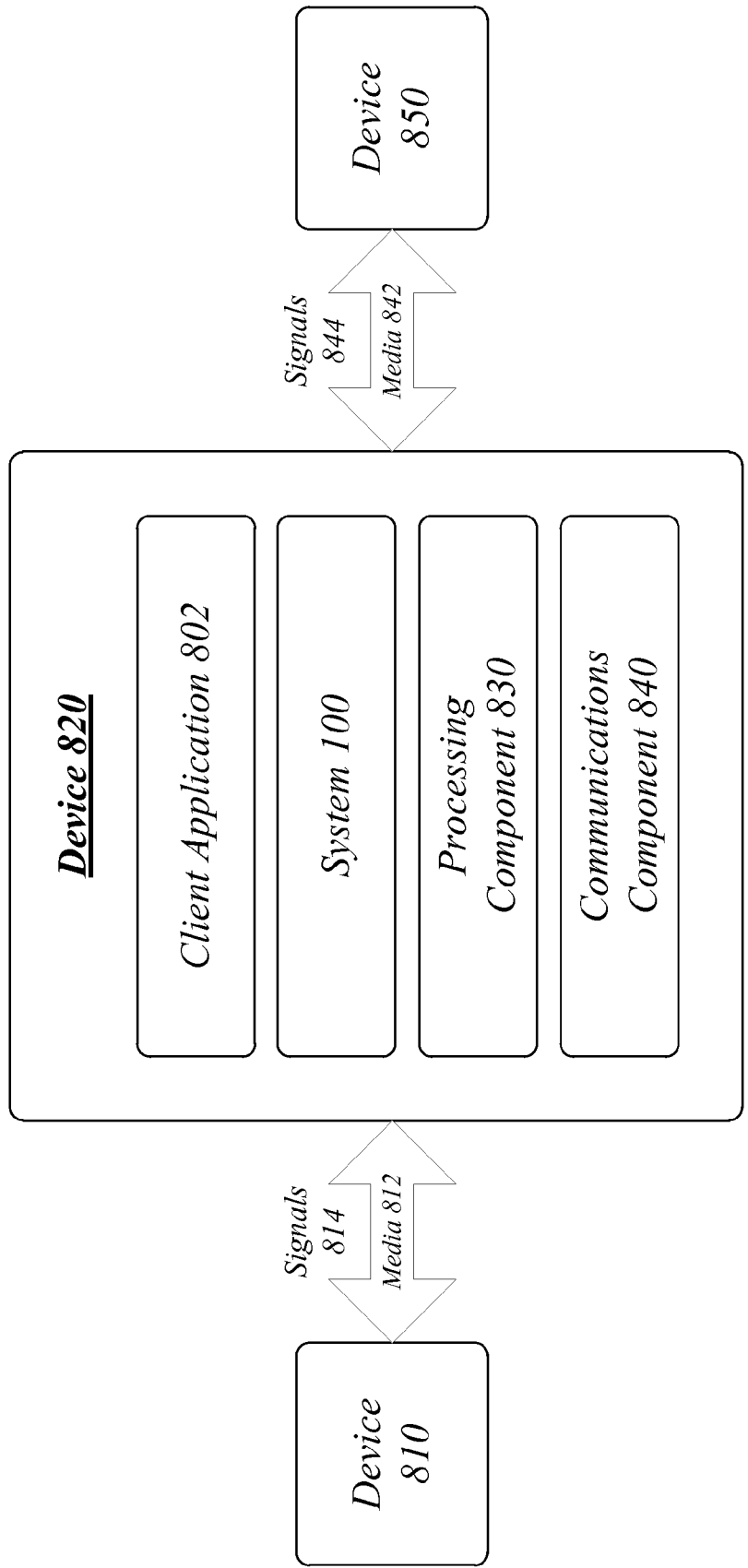
FIG. 8 illustrates an embodiment of a centralized system for the system of FIG. 1.

FIG. 8 illustrates a block diagram of a centralized system 800. The centralized system 800 may implement some or all of the structure and/or operations for the system 100 in a single computing entity, such as entirely within a single device 820.

The device 820 may comprise any electronic device capable of receiving, processing, and sending information for the system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The device 820 may execute processing operations or logic for the system 100 using a processing component 830. The processing component 830 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 820 may execute communications operations or logic for the system 100 using communications component 840. The communications component 840 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 840 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 812, 842 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The device 820 may communicate with other devices 810, 850 over a communications media 812, 842, respectively, using communications signals 814, 844, respectively, via the communications component 840. The devices 810, 850 may be internal or external to the device 820 as desired for a given implementation.

In this implementation, the file descriptor application 120 of system 100 may be implemented in a single device, such as a client device or a network device. For instance, the file descriptor application 120 may be co-located with a client application 802 on a client device. The client application 802 may request services from the file descriptor application 120 to generate file descriptors 134 for various content files 112 managed by the client application 802. For instance, the client application 802 may comprise a client application from a productivity suite of inter-related client applications, server applications and web services, designed for a particular operating system, such as a MICROSOFT® OFFICE productivity suite for MICROSOFT WINDOWS®, made by Microsoft Corporation, Redmond, Wash., as previously described. In another example, the client application 802 may comprise a system program, such as an operating system for the device 820. In this case, the client application 802 may request file descriptor services from the file descriptor application 120 for file management operations, such as file presentation, navigation, selection, and so forth. In yet another example, the file descriptor application 120 may be co-located with a client application 802 on a network device, such as a server, web server, enterprise server or cloud server. In this case, the client application 802 and the system 100 may both be cloud-based services that are accessed via one or both devices 810, 850. Examples of such implementations may include without limitation MICROSOFT WINDOWS LIVE®, MICROSOFT OFFICE WEB APPLICATIONS, MICROSOFT OFFICE LIVE, MICROSOFT LIVE MEETING, MICROSOFT OFFICE PRODUCT WEB SITE, MICROSOFT UPDATE SERVER, and MICROSOFT OFFICE 365.

FIG. 9 illustrates a block diagram of a distributed system 900. The distributed system 900 may distribute portions of the structure and/or operations for the system 100 across multiple computing entities. Examples of distributed system 900 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 900 may comprise a client device 910 and a server device 950. In general, the client device 910 and the server device 950 may be the same or similar to the client device 820 as described with reference to FIG. 8. For instance, the client device 910 and the server device 950 may each comprise a processing component 930 and a communications component 940 which are the same or similar to the processing component 830 and the communications component 840, respectively, as described with reference to FIG. 8. In another example, the devices 910, 950 may communicate over a communications media 912 using communications signals 914 via the communications components 940.

The client device 910 may comprise or employ one or more client programs that operate to perform various methodologies in accordance with the described embodiments. In one embodiment, for example, the client device 910 may implement the client application 802 as described with reference to FIG. 8.

The server device 950 may comprise or employ one or more server programs that operate to perform various methodologies in accordance with the described embodiments. In one embodiment, for example, the server device 950 may implement the file descriptor application 120 of the system 100.

In this implementation, the client application 802 of the client device 910 may send a file descriptor request 110 for a content file 112 in the form of communication signals 914 over a network to the server device 950. The client application 802 may initiate the file descriptor request 110 using a push model or a pull model as previously described. In one embodiment, the file descriptor request 110 may include the content file 112. In one embodiment, the file descriptor request 110 may include a content file identifier which can be used by the file descriptor application 120 to retrieve the content file 112 from the data store 124 or a network storage device. The file descriptor application 120 may generate file descriptor construct information 132 and/or a file descriptor 134 as previously described, and send a file descriptor response 130 with the file descriptor construct information 132 and/or a file descriptor 134 to the client device 910 via communication signals 914. In the case of receiving file descriptor construct information 132, the client application 802 or an operating system for the client device 910 may assemble or generate a file descriptor 134 to represent the content file 112. In the case of receiving a file descriptor 134, the client application 802 or the operating system for the client device 910 may present the file descriptor 134 to represent the content file 112.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 10 illustrates one embodiment of a logic flow 1000. The logic flow 1000 may be representative of some or all of the operations executed by one or more embodiments described herein.

In the illustrated embodiment shown in FIG. 10, the logic flow 1000 may receive a file descriptor request to generate a file descriptor for a content file from a client application at block 1002. For example, the file descriptor application 120 of the system 100 may receive a file descriptor request 110 to generate a file descriptor 134 for a content file 112 from a client application 802.

The logic flow 1000 may retrieve a file descriptor model for the file descriptor at block 1004. For example, the file descriptor extractor component 122-1 may retrieve a file descriptor model 126-1 for the file descriptor 134 from the data store 124.

The logic flow 1000 may extract one or more content parts from the content file based on the file descriptor model at block 1006. For example, the file descriptor extractor component 122-1 may extract one or more content parts 204-*c* from the content file 112 based on the file descriptor model 126-1. The file descriptor extractor component 122-1 may also identify one or more extracted content parts 208-*s* from the content file 112 by utilizing a previously assigned content part identifier 206-*d* or by assigning a content part identifier 206-*d* to the extracted content part. The content part identifier 206-*d* may be used to synchronize updates to the file descriptor 134.

During extraction operations, the file descriptor extractor component 122-1 may determine that a content part 204-*c* should be replaced with another content part. In this case, the file descriptor extractor component 122-1 may notify the file descriptor substitute component 122-2. The file descriptor substitute component 122-2 may substitute a content part 204-*c* from the content file 112 with a replacement content part 304-*f*. The file descriptor substitute component 122-2 may retrieve the replacement content part 304-*f* from the data store 124, or generate the replacement content part 304*l* during run-time. The file descriptor substitute component 122-2 may substitute the content part 304-*f* with the replacement content part 304*l*, which then becomes the extracted content part 208-*s*.

The logic flow 1000 may generate a file descriptor response to the file descriptor request, the file descriptor response comprising file descriptor construct information or the file descriptor generated using the file descriptor model and the extracted content parts at block 1008. For example, the file descriptor assembly component 122-3 may generate a file descriptor response 130 to the file descriptor request 110, the file descriptor response 130 comprising file descriptor construct information 132 or the file descriptor 134 generated using the file descriptor model 126-1 and the extracted content parts 208-*s*.

The file descriptor assembly component 122-3 may generate file descriptor construct information 132 for use by the client application 802 to generate the file descriptor 134 for the content file 112. In one embodiment, the file descriptor construct information 132 may comprise the file descriptor model 126-1 and one or more extracted content parts 208-*s* extracted from the content file 112. In one embodiment, the file descriptor construct information may comprise a file descriptor model identifier 604 for the file descriptor model 126-1, one or more file descriptor tile identifiers 606-*h* for file descriptor tiles 224-*e* of the file descriptor model 126-1, and one or more content part identifiers 206-*d* for extracted content parts 208-*s* from the content file 112 corresponding to the file descriptor tiles 224-*e*.

The file descriptor assembly component 122-3 may generate the file descriptor 134 from one or more extracted content parts 208-*s* from the content file 112 based on the file descriptor model 126-1. For instance, the file descriptor assembly component 122-3 may insert each of the extracted content parts 208-*s* into a corresponding file descriptor tile 224-*e* of a file descriptor surface 222. The file descriptor assembly component 122-3 may make any adjustments to the inserted parts using a fitting algorithm as previously discussed.

The logic flow 1000 may send the file descriptor response to the client application at block 1010. For example, the file descriptor application 120 may send the file descriptor response 130 to the client application 802.

One the file descriptor 134 has been generated by either the file descriptor application 120 or the client application 802, changes made to content parts 204-*c* of the content file 112 may be propagated to the file descriptor 134. The file descriptor synchronizer component 122-4 may synchronize changes to content parts 204-*c* of the content file 112 with corresponding extracted content parts 208-*s* of the content file 112 represented by the file descriptor 134. This ensures that the content parts 204-*c* of the content file 112 and extracted content parts 208-*s* of the file descriptor 134 are synchronized and remain substantially the same. As a result, the file descriptor 134 continues to accurately represent the underlying content file 112 in a substantially real-time manner.

FIG. 11 illustrates an embodiment of an exemplary computing architecture 1100 suitable for implementing various embodiments as previously described. In one embodiment, the computing architecture 1100 may comprise or be implemented as part of an electronic device. Examples of an electronic device may include those described with reference to FIG. 8, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 1100. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1100 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1100.

As shown in FIG. 11, the computing architecture 1100 comprises a processing unit 1104, a system memory 1106 and a system bus 1108. The processing unit 1104 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1104.

The system bus 1108 provides an interface for system components including, but not limited to, the system memory 1106 to the processing unit 1104. The system bus 1108 can be any of several types of bus structure that may further interconnect to a memory bus (with or without a memory controller), a peripheral bus, and a local bus using any of a variety of commercially available bus architectures. Interface adapters may connect to the system bus 1108 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1100 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1106 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 11, the system memory 1106 can include non-volatile memory 1110 and/or volatile memory 1112. A basic input/output system (BIOS) can be stored in the non-volatile memory 1110.

The computer 1102 may include various types of computer-readable storage media in the form of one or more lower speed memory units, including an internal (or external) hard disk drive (HDD) 1114, a magnetic floppy disk drive (FDD) 1116 to read from or write to a removable magnetic disk 1118, and an optical disk drive 1120 to read from or write to a removable optical disk 1122 (e.g., a CD-ROM or DVD). The HDD 1114, FDD 1116 and optical disk drive 1120 can be connected to the system bus 1108 by a HDD interface 1124, an FDD interface 1126 and an optical drive interface 1128, respectively. The HDD interface 1124 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1110, 1112, including an operating system 1130, one or more application programs 1132, other program modules 1134, and program data 1136. In one embodiment, the one or more application programs 1132, other program modules 1134, and program data 1136 can include, for example, the various applications and/or components of the system 100.

A user can enter commands and information into the computer 1102 through one or more wire/wireless input devices, for example, a keyboard 1138 and a pointing device, such as a mouse 1140. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1104 through an input device interface 1142 that is coupled to the system bus 1108, but can be connected by other interfaces such as a parallel port, IEEE 1394 serial port, a game port, a USB port, an IR interface, and so forth.

A monitor 1144 or other type of display device is also connected to the system bus 1108 via an interface, such as a video adaptor 1146. The monitor 1144 may be internal or external to the computer 1102. In addition to the monitor 1144, a computer typically includes other peripheral output devices, such as speakers, printers, and so forth.

The computer 1102 may operate in a networked environment using logical connections via wire and/or wireless communications to one or more remote computers, such as a remote computer 1148. The remote computer 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wire/wireless connectivity to a local area network (LAN) 1152 and/or larger networks, for example, a wide area network (WAN) 1154. Such LAN and WAN networking environments are commonplace in offices and companies, and facilitate enterprise-wide computer networks, such as intranets, all of which may connect to a global communications network, for example, the Internet.

When used in a LAN networking environment, the computer 1102 is connected to the LAN 1152 through a wire and/or wireless communication network interface or adaptor 1156. The adaptor 1156 can facilitate wire and/or wireless communications to the LAN 1152, which may also include a wireless access point disposed thereon for communicating with the wireless functionality of the adaptor 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wire and/or wireless device, connects to the system bus 1108 via the input device interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 12:
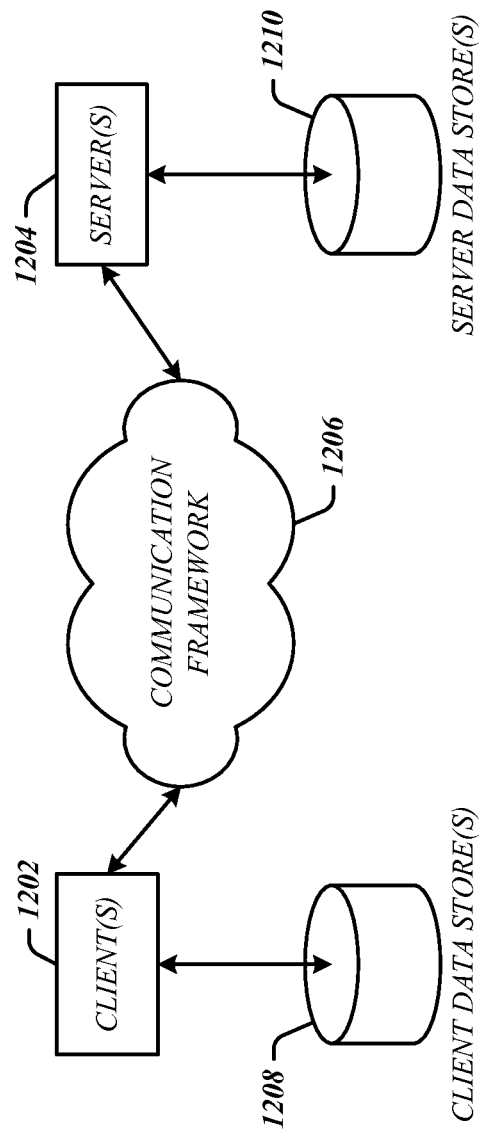
FIG. 12 illustrates an embodiment of a communications architecture.

FIG. 12 illustrates a block diagram of an exemplary communications architecture 1200 suitable for implementing various embodiments as previously described. The communications architecture 1200 includes various common communications elements, such as a transmitter, receiver, transceiver, radio, network interface, baseband processor, antenna, amplifiers, filters, power supplies, and so forth. The embodiments, however, are not limited to implementation by the communications architecture 1200.

As shown in FIG. 12, the communications architecture 1200 comprises includes one or more clients 1202 and servers 1204. The clients 1202 may implement the client device 910. The servers 1204 may implement the server device 950. The clients 1202 and the servers 1204 are operatively connected to one or more respective client data stores 1208 and server data stores 1210 that can be employed to store information local to the respective clients 1202 and servers 1204, such as cookies and/or associated contextual information.

The clients 1202 and the servers 1204 may communicate information between each other using a communication framework 1206. The communications framework 1206 may implement any well-known communications techniques and protocols. The communications framework 1206 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1206 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1202 and the servers 1204. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. An apparatus, comprising:
    a processor circuit; and
    a file descriptor application operative on the processor circuit to manage file descriptors for content files, the file descriptor application arranged to
        receive a file descriptor request from a client application,
        generate a file descriptor or file descriptor construct information for a content file, wherein the file descriptor provides a preview of contents of the content file and the file descriptor construct information is for use by the client application to generate the file descriptor,
        synchronize changes made to the content file with the file descriptor, and
        send a file descriptor response with the file descriptor or file descriptor construct information to the client application.

2. The apparatus of claim 1, the file descriptor application comprising a file descriptor extractor component operative to retrieve a file descriptor model for the file descriptor, extract one or more content parts from the content file based on the file descriptor model, and identify each of the extracted content parts with a content part identifier, wherein each of the extracted content parts corresponds to a file descriptor tile of a file descriptor surface of the file descriptor.

3. The apparatus of claim 1, the file descriptor application comprising a file descriptor substitute component operative to substitute an extracted content part from the content file with a replacement content part.

4. The apparatus of claim 1, the file descriptor application comprising a file descriptor assembly component operative to generate the file descriptor from one or more extracted content parts from the content file based on a file descriptor model.

5. The apparatus of claim 1, the file descriptor application comprising a file descriptor assembly component operative to generate the file descriptor construct information for use by the client application to generate the file descriptor for the content file, the file descriptor construct information comprising a file descriptor model with a file descriptor surface and one or more file descriptor tiles arranged to present one or more extracted content parts from the content file.

6. The apparatus of claim 1, the file descriptor application comprising a file descriptor assembly component operative to generate the file descriptor construct information for use by the client application to generate the file descriptor for the content file, the file descriptor construct information comprising a file descriptor model identifier, at least one file descriptor tile identifier to identify a file descriptor tile of a file descriptor model, and at least one content part identifier to identify a content part of the content file corresponding to the file descriptor tile identified by the file descriptor tile identifier.

7. The apparatus of claim 1, the file descriptor application comprising a file descriptor synchronizer component operative to synchronize changes to content parts of the content file with corresponding extracted content parts of the content file of the file descriptor.

8. A computer-implemented method, comprising:
    receiving a file descriptor request to generate file descriptor construct information or a file descriptor for a content file, the file descriptor to provide a preview of contents of the content file, the file descriptor construct information for use by a client application to generate the file descriptor for the content file;
    generating, by a processor circuit, a file descriptor response to the file descriptor request; and
    sending the file descriptor response to the client application.

9. The computer-implemented method of claim 8, comprising retrieving a file descriptor model for the file descriptor.

10. The computer-implemented method of claim 8, comprising extracting one or more content parts from the content file based on a file descriptor model.

11. The computer-implemented method of claim 8, comprising identifying one or more extracted content parts from the content file.

12. The computer-implemented method of claim 8, comprising generating a replacement content part for an extracted content part of the content file.

13. The computer-implemented method of claim 8, comprising generating the file descriptor construct information comprising a file descriptor model and one or more extracted content parts from the content file.

14. The computer-implemented method of claim 8, comprising generating file descriptor construct information for use by the client to generate the file descriptor for the content file, the file descriptor construct information comprising a file descriptor model identifier for a file descriptor model, one or more file descriptor tile identifiers for file descriptor tiles of the file descriptor model, and one or more content part identifiers for extracted content parts from the content file corresponding to the file descriptor tiles.

15. The computer-implemented method of claim 8, comprising generating the file descriptor from one or more extracted content parts from the content file based on a file descriptor model.

16. The computer-implemented method of claim 8, comprising sending the file descriptor response with file descriptor construct information or the file descriptor to the client.

17. The computer-implemented method of claim 8, comprising synchronizing changes to content parts of the content file with corresponding extracted content parts of the content file of the file descriptor.

18. A computer-readable storage medium, comprising a memory to store instructions that, when executed, cause a system to:
    receive a file descriptor request to generate a file descriptor or file descriptor construct information for a content file, the file descriptor to provide a preview of contents of the content file, file descriptor construct information for use by a client application to generate the file descriptor for the content file;
    retrieve a file descriptor model for the file descriptor;
    extract one or more content parts from the content file based on the file descriptor model;
    generate a file descriptor response to the file descriptor request, the file descriptor response comprising the file descriptor construct information or the file descriptor generated using the file descriptor model and the extracted content parts; and send the file descriptor response to the client application.

19. The computer-readable storage medium of claim 18, comprising instructions that when executed cause the system to substitute an extracted content part from the content file with a replacement content part.

20. The computer-readable storage medium of claim 18, comprising instructions that when executed cause the system to:

identify each extracted content part from the content file with a content part identifier; and synchronize changes to each content part of the content file having a corresponding extracted content part of the content file of the file descriptor based on the content part identifier.

* * * * *